(12) United States Patent
Okumura et al.

(10) Patent No.: US 8,692,130 B2
(45) Date of Patent: Apr. 8, 2014

(54) TRANSPARENT THIN PLATE

(75) Inventors: Shuzo Okumura, Kyoto (JP); Ryomei Omote, Kyoto (JP); Takao Hashimoto, Kyoto (JP); Yuki Matsui, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 503 days.

(21) Appl. No.: 12/595,899

(22) PCT Filed: Apr. 9, 2008

(86) PCT No.: PCT/JP2008/056986
§ 371 (c)(1),
(2), (4) Date: Mar. 12, 2010

(87) PCT Pub. No.: WO2008/133006
PCT Pub. Date: Nov. 6, 2008

(65) Prior Publication Data
US 2011/0308843 A1 Dec. 22, 2011

(30) Foreign Application Priority Data

Apr. 16, 2007 (JP) ................................. 2007-106838

(51) Int. Cl.
*H05K 1/09* (2006.01)
*H05K 1/00* (2006.01)

(52) U.S. Cl.
USPC ........... 174/256; 174/250; 174/389; 343/807; 455/575.8

(58) Field of Classification Search
USPC ........................................................ 174/256
See application file for complete search history.

(56) References Cited

U.S. PATENT DOCUMENTS

| 6,125,289 A | 9/2000 | Lee |
| 6,713,161 B1 * | 3/2004 | Okumura et al. ............. 428/203 |
| 7,203,533 B1 * | 4/2007 | Tischer ....................... 455/575.8 |
| 2005/0121213 A1 * | 6/2005 | Arakawa et al. ......... 174/35 MS |
| 2009/0051620 A1 | 2/2009 | Ishibashi et al. |

FOREIGN PATENT DOCUMENTS

| EP | 1 868 263 | 12/2007 |
| JP | 61-157673 | 7/1986 |
| JP | 2717734 | 2/1998 |
| JP | 11-27357 | 1/1999 |
| JP | 11-266095 | 9/1999 |

(Continued)

OTHER PUBLICATIONS

International Search Report issued Jul. 29, 2008 in International (PCT) Application No. PCT/JP2008/056986.

(Continued)

*Primary Examiner* — William H Mayo, III
*Assistant Examiner* — Hiram E Gonzalez
(74) *Attorney, Agent, or Firm* — Wenderoth, Lind & Ponack, LLP

(57) ABSTRACT

A transparent thin plate including a transparent substrate in a sheet form, a mesh layer formed on a surface of the transparent substrate and made of an opaque material having a structure wherein an outline of meshes is made of bands that are very thin and have a substantially equal width, and having a light transmittance of 50% or more. The transparent thin plate also includes a colored layer that is arranged in a state in which the colored layer is laminated in a partial area of the mesh layer and on the surface of the mesh layer, and has a color different from that of the opaque material constituting the mesh layer.

6 Claims, 6 Drawing Sheets

(56) References Cited

FOREIGN PATENT DOCUMENTS

| | | |
|---|---|---|
| JP | 2003-113493 | 4/2003 |
| JP | 2003-183887 | 7/2003 |
| JP | 2004-111783 | 4/2004 |
| JP | 2004-114407 | 4/2004 |
| JP | 2004-119793 | 4/2004 |
| JP | 2004-317849 | 11/2004 |
| JP | 2005-127219 | 5/2005 |
| JP | 2006-210763 | 8/2006 |
| JP | 2006-344163 | 12/2006 |
| WO | 2006/106982 | 10/2006 |

OTHER PUBLICATIONS

Patent Cooperation Treaty (PCT) International Preliminary Report on Patentability issued Jul. 29, 2008 in corresponding to International Application No. PCT/JP2008/056986.

Extended European Search Report (in English language) issued May 18, 2012 in corresponding European Patent Application No. 08 74 0089.

Supplementary European Search Report (in English language) issued Nov. 9, 2012 in corresponding European patent application No. 08 74 0089.

* cited by examiner

TRANSPARENT THIN PLATE

BACKGROUND OF THE INVENTION

1. Technical Field

The present invention relates to a transparent thin plate wherein a mesh layer made of meshes having a fine structure is formed on a surface of a transparent substrate. More specifically, the present invention relates to a transparent thin plate that is preferably usable for a transparent flip cover usable in an electrostatic capacity switch electrode, an antenna or others that are used in portable instruments, household electric appliances, automobile equipment, or the like.

2. Description of the Related Art

About portable instruments, household electric appliances, PDAs, automobile equipment, and other small-sized instruments, there is known a type wherein a transparent flip cover is set up to an instrument and the instrument is used in the state that the flip cover is opened during use. In connection with the function of this flip cover, the cover is used merely to protect the body of the instrument in many cases; however, attempts have been to add an input function or an antenna function to the flip cover.

The applicant filed an antenna-attached packaging member wherein a circuit made of a transparent electric conductor is arranged on a surface of a flip cover (Japanese Patent Application No. 2005-127219). When a resin molded body having the same structure as this packaging member is used as a flip cover and this is used as an electrostatic capacity switch, inputs can be attained from the front and rear surfaces of the flip cover. By setting its electrode patterns and software therefor, an instrument can be realized which can cope with functions that are required for the front and rear surfaces, respectively, that is, for states in which the flip cover is opened and closed, respectively.

SUMMARY OF THE INVENTION

1. Issue to be Solved

In the case of a transparent flip cover using visually transparent electrodes, an inputting position therein can be specified by the following operation when the flip cover is in a closed state: an operation of touching the corresponding position of the flip cover in accordance with, for example, a display indication displayed at the lower side. However, in the state that the flip cover is opened, a pattern for showing an inputting position is not given at all, so that the key operation becomes remarkably inconvenient. Accordingly, only the realization of such an operation that an input is decided in accordance with whether some position of the flip cover is touched or not has been attained.

Accordingly, a technical issue to be solved by the present invention is to provide a transparent thin plate capable of making patterns on both surface sides thereof different from each other when the plate is viewed from both side surfaces, respectively, as one of the surfaces appears to be transparent when the surface is viewed while the other surface appears to be a surface to which an arbitrary pattern is added when the other surface is viewed.

2. Means for Solving the Issue

In order to solve the above-mentioned technical issue, the present invention provides a transparent thin plate having the following constitution.

According to a first aspect of the present invention, there is provided a transparent thin plate, comprising:

a transparent substrate in a thin plate form, a mesh layer that is formed over a surface of the transparent substrate, and is a circuit pattern comprising an opaque electroconductive material having a net structure wherein an outline of meshes is made of bands that are very thin and have a substantially equal width, and having a light transmittance of 50% or more, and a colored layer that is arranged in a state that the colored layer is laminated in a partial area of the mesh layer and on a surface of the mesh layer, and has a color different from that of a material constituting the mesh layer.

According to a second aspect of the present invention, there is provided the transparent thin plate according to the first aspect, wherein the band width of the very thin bands in the mesh layer is 30 μm or less.

According to a third aspect of the present invention, there is provided the transparent thin plate according to the first aspect, wherein a shape of openings in the meshes of the mesh layer is polygonal.

According to a fourth aspect of the present invention, there is provided the transparent thin plate according to the first aspect, wherein a low reflection layer having a color different from the color which the colored layer has is arranged in a state that the low reflection layer is further laminated over a surface of the mesh layer present in an area where the colored layer is not arranged.

According to a fifth aspect of the present invention, there is provided the transparent thin plate according to the fourth aspect, wherein the low reflection layer is arranged on a surface of the very thin bands by a black plating treatment.

According to a sixth aspect of the present invention, there is provided the transparent thin plate according to the fourth aspect, wherein the low reflection layer is arranged on a surface of the very thin bands by a chemical blackening conversion treatment.

According to a seventh aspect of the present invention, there is provided the transparent thin plate according to the first aspect, further comprising, between the mesh layer and the transparent substrate, a black colored layer arranged along the meshes of the mesh layer.

3. Effects of the Invention

According to the present invention, the mesh layer has a light transmittance of 50% or more, and is a layer wherein the outline of meshes is made of the bands, which are very thin and have a substantially equal width; therefore, the outline is not easily perceived as a whole so that the whole is perceived to be transparent. On the other hand, the mesh layer area having, on the surface thereof, the colored layer has a nature that the pattern of the colored layer is easily recognized through the boundary between the area where the colored layer is formed and the area where the colored layer is not formed. Accordingly, when the transparent thin plate is viewed from the side on which the colored layer is arranged, the pattern can be perceived by the effect of the colored layer. On the other hand, when the transparent thin plate is viewed from the side on which the colored layer is not arranged, the mesh layer cannot be perceived so that the thin plate is perceived to be transparent as a whole.

When the band width of the mesh layer is set to 30 μm or less, the mesh layer is not easily perceived with the naked eye. Thus, the transparency of the transparent thin plate can be made high.

When the low reflection layer is arranged on the surface of the mesh layer or the colored layer, reflection on the mesh layer is restrained so that the layer can be made difficult to perceive.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

With reference to the drawings, a transparent thin plate according to an embodiment of the present invention will be described hereinafter.

Figure 1:
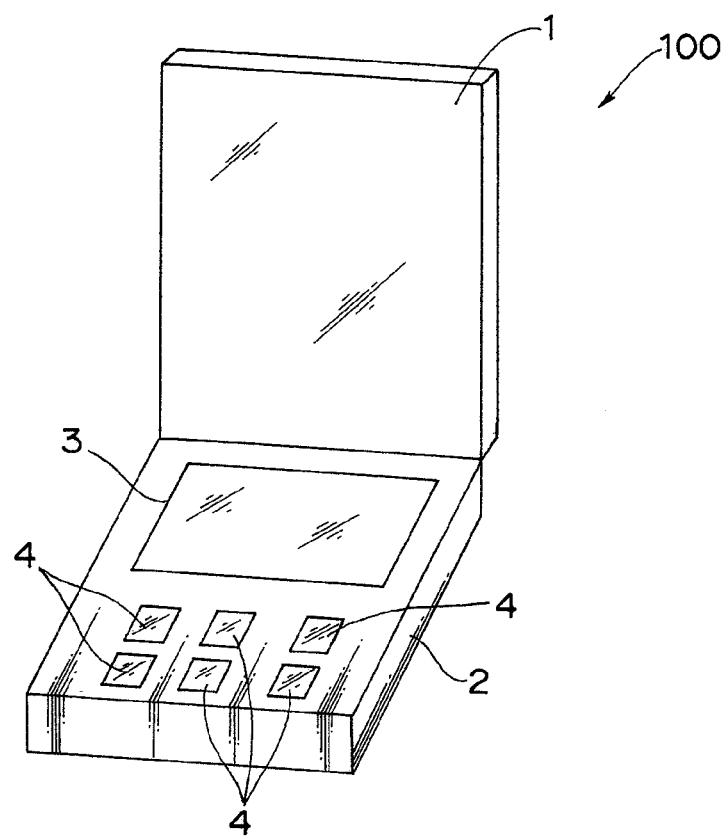
FIG. 1 is a schematic view illustrating an external structure of a portable instrument terminal wherein a transparent thin plate according to an embodiment of the present invention is used as a flip cover.

FIG. 1 is a schematic view illustrating an external structure of a portable instrument terminal wherein the transparent thin plate according to an embodiment of the present invention is used as a flip cover. A portable instrument terminal 100, which is the terminal, is provided with a body 2 having a display 3 and operating buttons 4, and a flip cover 1. The flip cover is bonded to the body 2 with hinges in such a manner that the cover can be opened from the body 2 and closed toward the body 2. In the state where the cover is closed, the cover functions as a cover for protecting the display 3 and the operating buttons 4 in the body surface. Furthermore, in the state that the cover is opened, the cover is positioned over the body as illustrated in FIG. 1, and functions as an antenna and/or an electrostatic capacity switch by aid of an electroconductive mesh layer arranged in the cover.

Figure 2:
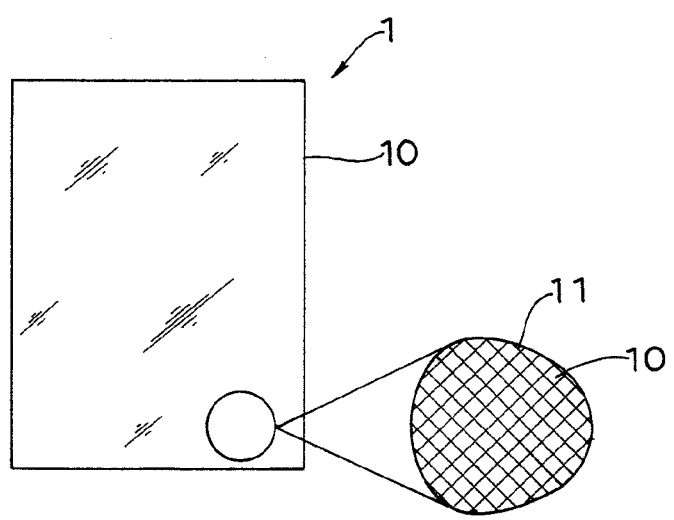
FIG. 2 is an external view of the flip cover of the portable instrument terminal in FIG. 1, and an enlarged partial view thereof.

As illustrated in FIG. 2, the flip cover 1 is made into a transparent plate form. A plastic substrate 10 constituting the flip cover is made of a transparent plastic thin plate. A mesh layer 11 having meshes is adhered onto a surface of the transparent plastic substrate. The flip cover may be formed to have a curved face in accordance with the surface form of a portable instrument terminal to be used.

For the transparent plastic substrate 10, a transparent resin may be used, examples of which include polycarbonate, acrylic, polyethylene terephthalate, and triacetylcellulose. A transparent glass sheet may be used.

The mesh layer 11 is made of a thin film of an electroconductive material, and is a layer having a light transmittance of 50% or more wherein the outline of its meshes is made of bands that are very thin and have a substantially equal width. Since the mesh layer 11 is made of the very thin bands, the mesh pattern of the mesh layer 11 can be perceived when the layer is viewed from a position near the layer. However, the layer appears to be transparent as a whole in a case where the layer is viewed apart therefrom when the instrument terminal is used.

As the electroconductive material constituting the mesh layer 11, a film of a metal such as copper, nickel, aluminum, gold, or silver, an electroconductive paste film containing fine particles of such a metal, a carbon paste film, or the like may be used. The mesh layer 11 is formed by photo-etching a thin film formed on the transparent plastic substrate 10, or etching using a printed resist. The step of forming the mesh layer will be described later.

An antenna and electrodes of an electrostatic capacity switch (not illustrated) are located in partial regions of the mesh layer 11. When a power feeding section of the portable terminal 100 is brought into contact with the electrodes, the mesh layer 11 is connected electrically to the body 2 of the portable terminal 100.

When the surfaces of the metallic very fine lines of the mesh layer are subjected to a low reflection treatment, the reflected color of the metal is restrained so that the existence of the transparent antenna 11 becomes inconspicuous. In this manner it is possible to make the transparency of the flip cover 1 higher.

Specific examples of the low reflection treatment include a chemical conversion treatment, a plating treatment, and other surface treatments. The chemical conversion treatment is a treatment for forming a low reflection layer on the metallic surface by an oxidization treatment or a sulfurization treatment. For example, when copper is used as the material of the mesh layer and an oxide coat is formed on the surface thereof by an oxidization treatment, the surface of the mesh layer can be treated into black color having light-reflection-preventing performance without decreasing the sectional dimension of the mesh layer.

When the mesh layer is plated with, for example, black chromium for the plating treatment, the mesh layer surface can be treated into black color having light-reflection-preventing performance. When the layer is plated with copper at a high current density, the surface can be treated into brown color.

Figure 3A:
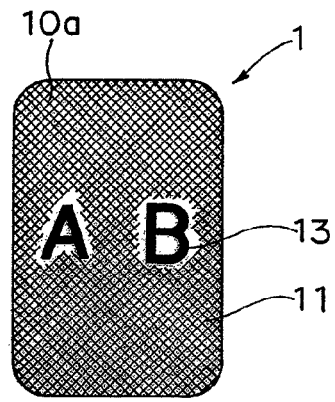
FIG. 3A is a view illustrating an external structure of the flip cover that can be viewed from the user's side in the state that the flip cover is opened.
Figure 3B:
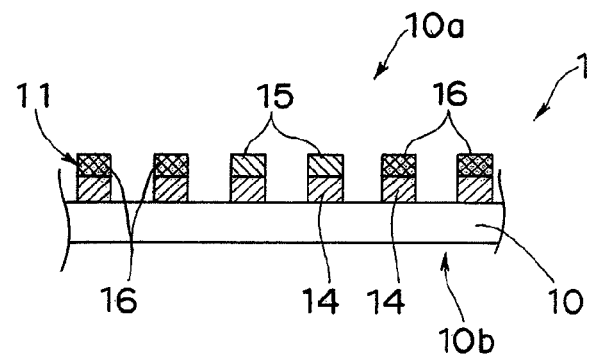
FIG. 3B is an enlarged partial view of the sectional shape of the flip cover.
Figure 3C:
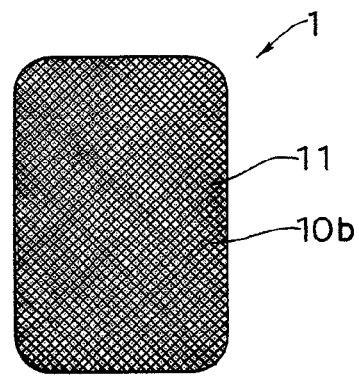
FIG. 3C is a view illustrating an external structure of the flip cover that can be viewed from the user's side in the state that the flip cover is closed.

FIG. 3A is a view illustrating an external structure of the flip cover that can be viewed from the user's side in the state in which the flip cover is opened. FIG. 3B is an enlarged partial view of the sectional shape of the flip cover. FIG. 3C is a view illustrating an external structure of the flip cover that can be viewed from the user's side in the state in which the flip cover is closed. In FIGS. 3A and 3C, the mesh pattern of the mesh layer 11 is illustrated. Actually, however, in the flip cover 1, the mesh layer 11 is composed of the very thin bands as described above; thus, the mesh pattern can hardly be perceived.

When the flip cover 1 is in the state where the cover is opened as illustrated in FIG. 3A, a pattern 13 is perceived on its surface 10a on the side which can be viewed by the user of the portable instrument 100, that is, the surface opposite to the portable instrument (hereinafter referred to as the pattern-side surface). The pattern 13 is based on the following: by coloring the surface of the mesh layer 11, the boundary between the colored region and the uncolored region makes its appearances as an easily perceivable difference.

On the other hand, when the flip cover 1 is in a closed state, no pattern 13 is attached onto its surface 10b on the side which can be viewed by the user of the portable instrument 100 (hereinafter referred to as the transparent-side surface). As described above, the mesh layer 11 is hardly perceived with ease. Thus, the flip cover 1 is perceived to be substantially transparent as a whole. When a low reflection treatment is applied to the transparent-side surface 10b side of the mesh layer 11 as described above in order to make the mesh layer 11 difficult to perceive, the transparency of the flip cover 1 can be made higher.

This flip cover 1 can be realized by a structure as illustrated in FIG. 3B. That is to say, the flip cover 1 has a structure wherein the mesh layer 11 is arranged on the surface of the plastic substrate 10 opposite to the instrument. The mesh layer 11 has a metallic layer 14 arranged on one of the surfaces of the transparent plastic substrate 10, a low reflection layer 15 arranged on the surface of the metallic layer, and a colored layer 16 arranged on the surface of the metallic layer. The low reflection layer 15 arranged on the surface of the metallic layer 14 is set in order to make the outline of the metallic layer 14, on which the colored layer 16 is arranged, easier to discriminate with the naked eye. The outline of the metallic layer 14 on which the low reflection layer 15 is arranged becomes difficult to perceive; therefore, in connection with the regions where the colored layer 16 is arranged, the boundary between the regions where the colored layer 16 is formed and the region where the colored layer 16 is not formed (the region to which the low reflection layer 15 is attached) is emphasized so that the pattern of the colored layer 16 becomes easy to perceive.

As a result, when the flip cover is viewed from the pattern-side surface 10a side, a pattern is perceived on the surface of the mesh layer 11 by a difference in structure between the layers arranged on the surface of the metallic layer 14. In other words, the outline portions of the metallic layer on which the low reflection layer 15 is arranged appear to be transparent while the outline of the metallic layer 14 on which the colored layer 16 is arranged appears to be colored. As a result, the flip cover 1 has such an external appearance that the pattern 13 colored by the colored layer 16 is attached onto the transparent sheet.

Figure 3D:
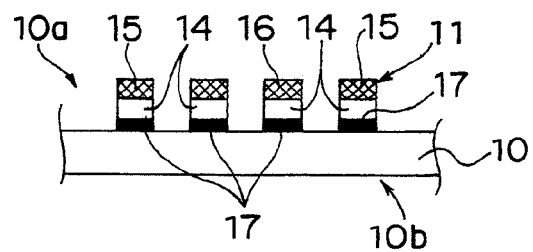
FIG. 3D is a view illustrating a sectional structure of a flip cover having a structure wherein a black colored layer is arranged between a metallic layer and a transparent plastic substrate.

As illustrated in FIG. 3D, a black colored layer 17 arranged on the whole of the mesh layer is arranged between the metallic layer 14 and the transparent plastic substrate 10, thereby making it possible to improve the transparency of the transparent-side surface of the flip cover 1. In other words, by coloring the surface, on the transparent-side 10b surface side, of the mesh layer 11 of the flip cover 1 into black, the reflection on the metallic layer 14 is prevented so that the transparency can be made higher.

As described above, the flip cover 1 can be formed in such a manner that the cover 1 is translucent as a whole so that the cover 1 appears to be transparent while a partial pattern can be perceived only on one of the surfaces thereof.

Accordingly, the following advantageous effect is produced: when the flip cover 1 is used as an electrostatic capacity switch, an inputting position can be specified through the indication of the operating buttons 4 or the display 3 positioned below the flip cover 1 in the state that the flip cover 1 is closed; on the other hand, in the state that the flip cover 1 is opened, an inputting position can be specified in accordance with the pattern attached to the colored regions 16. Produced is also a design effect that the pattern can be viewed only on one of the surfaces.

Figure 4:
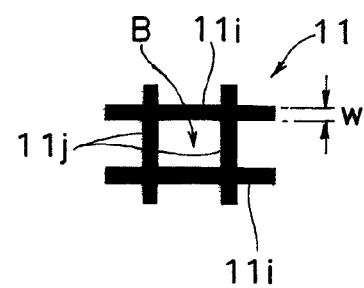
FIG. 4 is an enlarged view illustrating a basic pattern of the shape of meshes made of very thin bands constituting the mesh layer.
Figure 5:
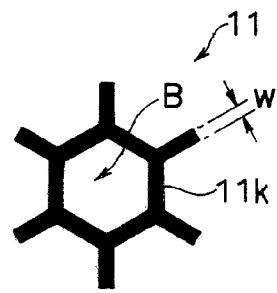
FIG. 5 is an enlarged view illustrating a modified example of the shape of meshes made of very thin bands.
Figure 6:
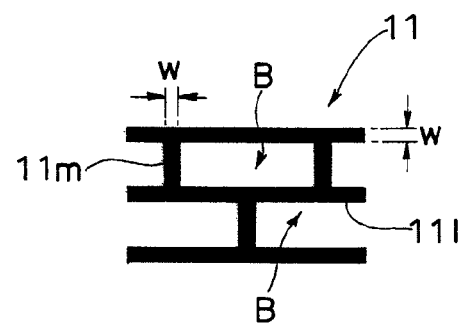
FIG. 6 is an enlarged view illustrating another modified example of the shape of meshes made of very thin bands.

FIGS. 4 to 6 are each an enlarged view of the mesh structure of the mesh layer 11. The mesh structure illustrated in FIG. 4 is formed into lattice-form meshes made of very thin linear bands extending in directions orthogonal to each other, and makes it possible to keep the light transmittance of the mesh layer at a level 70% or more certainly. The light transmittance is measured by use of a spectrometer (model number: NDH2000) manufactured by Nippon Denshoku Industries Co., Ltd. The light transmittance of the layer of the air, 100%, is used as the reference therefor. When the low reflection layer 15 is arranged on the metallic layer 14, the light transmittance is measured in the state that the low reflection layer 15 is formed.

The band width w of each of the bands, which are very thin bands 11i and 11j forming the outline of rectangles, is made into the same width of 30 μm or less. If the band width w is more than 30 μm, the meshes in the mesh layer 11 are conspicuous so that the designability of the flip cover 1 deteriorates. In other words, when the band width w is set to 30 μm or less, the existence of the mesh layer 11 becomes difficult to perceive so that the flip cover can be made transparent. When the film thickness of the mesh layer 11 is set in such a manner that the ratio of the band width to the film thickness becomes 0.5 or more, the performance of the mesh layer can be certainly kept with ease when the layer is used as an antenna or an electrostatic capacity switch.

The mesh structure of the mesh layer 1 illustrated in FIG. 5 is a structure wherein hexagonal meshes are continuously connected to each other so as to be made into a honeycomb mesh form. The band width of a very thin band 11k, which becomes the outline of hexagons, is 30 μm or less.

The mesh structure of the mesh layer illustrated in FIG. 6 is a structure wherein ladder-forms as nuclei are continued to each other in two directions so as to be made into a mesh form. The band width of very thin bands 11l and 11m, which become the outline of the ladder-forms, is 30 μm or less.

About the light transmittance of the mesh layer 11 of each of the structures, a light transmittance of 50% or more can be certainly kept by selecting a combination of the band width of the very thin bands 11i, 11j, 11k, 11l, and 11m with the size of openings B surrounded by the very thin band(s).

Besides the mesh forms illustrated in FIGS. 4 to 6, given are a mesh form that rectangles as nuclei are continued to each other, a mesh form that polygons as nuclei are continued to each other, and a mesh form that ladder-forms as nuclei are continued to each other. Of these mesh forms, a mesh form that squares as nuclei are continued to each other is preferred since the mesh pattern thereof is less recognized to be in a stripe form than that of a mesh form that nuclei in any other polygonal form are continued to each other.

Specifically, when a pattern in which nuclei having some shape are regularly continued to each other is viewed, the outline thereof tends to appear to be in the form of continuous stripes along the direction in which the nuclei (openings B) are continued. In the case of, for example, a pattern wherein hexagons are nuclei, the lines of the very thin bands along the direction in which the hexagons are continued become zig-zag. Thus, the very thin bands appear to be thicker by the amplitude of the zigzags. As a result, the very thin bands appear to be swelled. However, in the case where squares as nuclei are continued to each other, the very thin bands along the continuous direction become straight. Thus, it is not feared that the width of the very thin bands appears to be larger than the original width. As described above, the very thin bands are 30 μm or less in width, and very thin; therefore, the existence thereof is not easily recognized, and the meshes in the mesh layer are inconspicuous.

In a pattern wherein rectangles as nuclei are continued to each other, the pitch in the long side direction of the rectangles and that in the short side direction thereof are different from each other. Therefore, when the whole is viewed, the pattern appears to be denser in the short side direction, along which the pitch is shorter, than in the long side direction. This turns into the form of stripes so that the stripes appear to flicker. However, in the pattern wherein squares as nuclei are continued to each other, such a stripe form does not make its appearance so that the pattern becomes inconspicuous.

The following will describe a process for producing the flip cover 1 according to the present embodiment. FIGS. 7A to 7G are views illustrating the process for producing the flip cover according to the present embodiment.

Figure 7A:
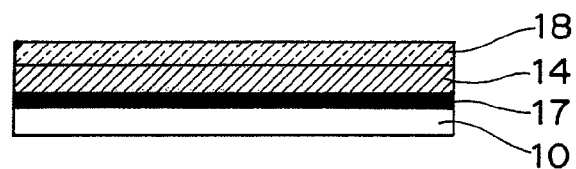
FIG. 7A is a view illustrating a production step of the flip cover according to the present embodiment.

As illustrated in FIG. 7A, on a surface of the transparent plastic substrate 10 are first arranged the black colored layer 17, the metallic layer 14, and a surface treatment layer 18 in the state in which these layers are successively laminated thereon.

The black colored layer 17 is formed, for example, by forming a low reflection treatment layer that is black or exhibits a color tone close to black on a surface of a copper foil piece by a chemical conversion treatment such as an oxidization treatment or a sulfurization treatment, a plating treatment, or the like, and laminating a black-forming surface onto the transparent substrate through a transparent adhesive. As disclosed in Japanese Patent Publication No. 2717734, an electroconductive layer and the black layer may be simultaneously formed by applying a hydrophilic transparent resin onto the transparent substrate surface and then subjecting the resultant to electroless plating.

The surface treatment layer 18 arranged on the surface of the metallic layer 14 is a layer arranged to color the metallic layer 14, and is formed on the metallic layer surface by, for example, plating with nickel.

Figure 7B:
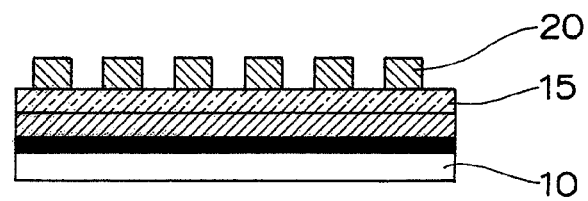
FIG. 7B is a view illustrating a production step of the flip cover according to the present embodiment subsequent to that in FIG. 7A.
Figure 8A:
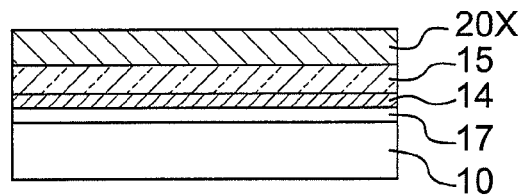
FIG. 8A is a view illustrating a step of attaching, to the surface of a surface-treated layer, a photoresist layer having a mesh pattern constituting a mesh layer.
Figure 8B:
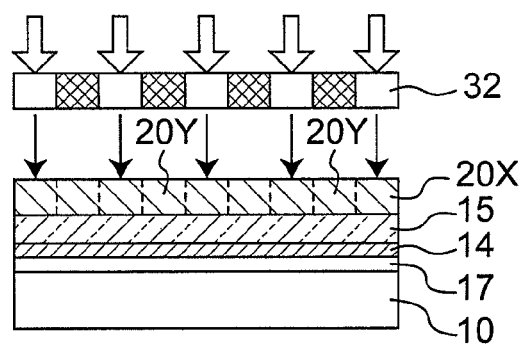
FIG. 8B is a view illustrating a step of attaching, to the surface of the surface-treated layer, the photoresist layer having the mesh pattern constituting the mesh layer, the step being subsequent to that in FIG. 8A.

Next, as illustrated in FIG. 7B, a photoresist layer 20 having a mesh pattern which constitutes the mesh layer is attached to the surface of the surface treatment layer 18. In the formation of the photoresist layer 20, for example, a photoresist film 20x is formed on the whole of the surface of the surface treatment layer 18 (see FIG. 8A), the photoresist film 20x is then exposed through a photomask to light (see FIG. 8B), and regions 20Y which had undergone the exposure are removed, thereby forming a mesh pattern of the photoresist film 20.

Figure 7C:
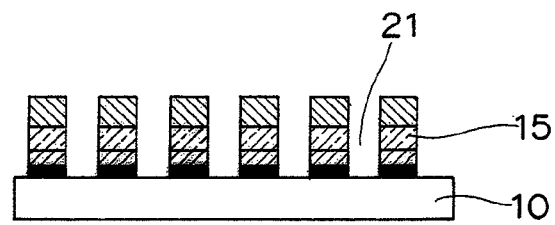
FIG. 7C is a view illustrating a production step of the flip cover according to the present embodiment subsequent to that in FIG. 7B.

Next, as illustrated in FIG. 7C, the resultant is subjected to an etching treatment to remove the black colored layer 17, the metallic layer 14, and the surface treatment layer 18 in regions 21 onto which the photoresist layer 20 is not attached.

Figure 7D:
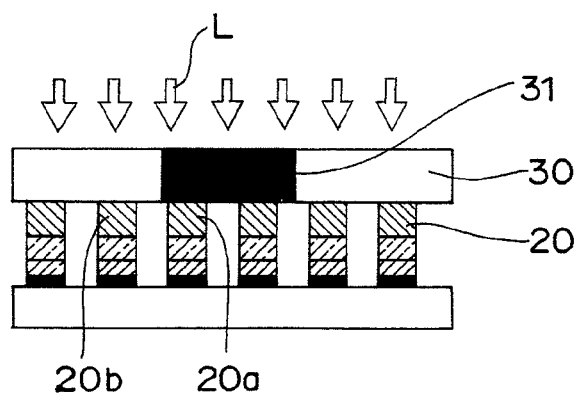
FIG. 7D is a view illustrating a production step of the flip cover according to the present embodiment subsequent to that in FIG. 7C.
Figure 7E:
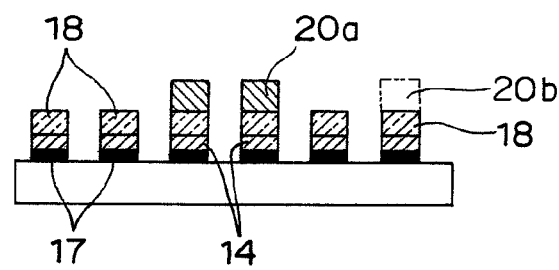
FIG. 7E is a view illustrating a production step of the flip cover according to the present embodiment subsequent to that in FIG. 7D.

Next, as illustrated in FIG. 7D, a photomask 30 having a light shielding region 31 made into an arbitrary pattern is used to expose the photoresist layer 20 to light to remove a photoresist layer 20b. FIG. 7E illustrates a state in which the layer is developed by way of the exposure using the photomask. A photoresist layer 20a in the region covered with the light shielding region 31 of the photomask 30 is caused to remain.

Figure 7F:
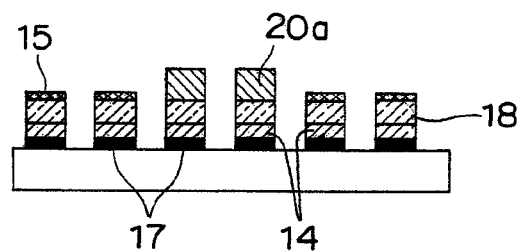
FIG. 7F is a view illustrating a production step of the flip cover according to the present embodiment subsequent to that in FIG. 7E.
Figure 7G:
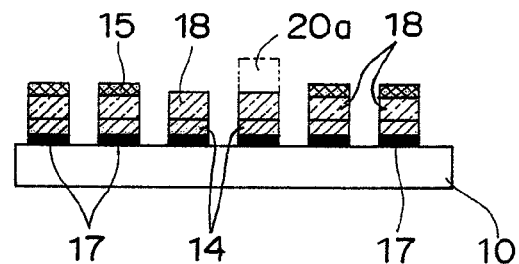
FIG. 7G is a view illustrating a production step of the flip cover according to the present embodiment subsequent to that in FIG. 7F.

Next, as illustrated in FIG. 7F, the black plating layer 15 as a low reflection layer is attached to the surface of the surface treatment layer 18. Instead of the black plating layer 15, a chemical conversion treatment for the low reflection layer may be conducted. Next, as illustrated in FIG. 7G, the remaining photoresist layer 20a is removed.

This causes the black plating to be attached to the surface of the colored layer (surface treatment layer 18) in the region other than the pattern of the photomask while the surface treatment layer 18 is made naked along the pattern of the photomask. In other words, in the region where the black plating layer 15 is arranged, reflection on the metal is restrained so that the region becomes difficult to perceive; on the other hand, in the region where the surface treatment layer 18 is naked, reflection on the metal is large so that the region becomes easy to perceive. This makes it possible to produce a flip cover as the pattern of the surface treatment layer 18 is attached to the surface of the mesh layer.

When the flip cover is viewed from the transparent plastic substrate 10 side, reflection of light is restrained by the black colored layer 17 so that the metallic layer 14 becomes difficult to perceive as a whole. Thus, the whole of the flip cover 1 is perceived to have transmittance and be a transparent plate-form member.

As described above, the flip cover 1 according to the present embodiment is translucent as a whole so that the cover 1 appears to be transparent while a partial pattern can be formed only on one of the surfaces.

The present invention is not limited to the present embodiment, and may be carried out in accordance with various other aspects.

In the above-mentioned embodiment, for example, the mesh layer is constructed in such a manner that the low reflection layer 15 and the colored layer 16 are arranged only on one of the surfaces of the metallic layer and a pattern is displayed only when the flip cover is viewed from one of the surface sides thereof. However, by arranging the low reflection layer 15 and the colored layer 16 onto both surfaces of the metallic layer 14, respectively, the flip cover 1 can be constructed in such a manner that patterns viewed from both surface sides of the flip cover 1 can be made different from each other.

The flip cover of the present invention is not limited to the embodiment wherein the individual layers, such as the mesh layer, are formed directly onto the transparent substrate, which is the body of the flip cover. Thus, the flip cover may be constructed by bonding (laminating) a member wherein the individual layers are formed on a transparent film onto the transparent substrate. By inserting a transparent film on which a mesh layer is arranged into a mold, and then injection-molding a transparent resin thereinto, a transparent substrate integrated with the transparent film may be formed (insert molding).

By properly combining arbitrary embodiments of the aforementioned various embodiments, the effects owned by each of them can be made effectual. When the transparent thin plate according to the present invention is viewed from one of both sides thereof, the transparent thin plate appears to be transparent while when the plate is viewed from the other side, the plate appears to have a pattern. Thus, the designability thereof can be made high. Furthermore, the transparent thin plate can be used as a flip cover of a portable instrument or the like that constitutes an electrostatic capacity switch by making patterns viewed therefrom at times when the flip cover is opened and closed different from each other.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A portable instrument terminal comprising:
a body having a display and operating buttons; and
a flip cover that is formed by a transparent thin plate and is connected to the body via hinges in such a manner that the cover can be opened from the body and closed toward the body,
the thin plate comprising:
a transparent substrate in a thin plate form; and a mesh layer that is formed on a front surface of the transparent substrate, and is a circuit pattern comprising an opaque electroconductive material having a net structure, wherein an outline of meshes is made of bands that have a substantially equal width, and a light transmissibility of 50% or more, the band width of the bands in the mesh layer being 30 µm or less,
the mesh layer comprising:
a metal layer formed on the front surface of the transparent substrate;
a colored layer that is laminated on a front surface of the metal layer and further has a color different from that of a material constituting the metal layer; and
a low reflection layer that is laminated in a partial area of the colored layer and on a front surface of the colored layer, and further has a color different from the color of the colored layer,
the transparent thin plate being perceived to have no visible pattern through the transparent substrate from a rear side of the transparent substrate, and being perceived to have a pattern based on the colored layer and the low reflection layer from a front side of the transparent substrate,
wherein the colored layer is located at a surface of the flip cover that confronts the body when the flip cover is closed, and
wherein the flip cover functions as an electrostatic capacity switch such that, when the flip cover is closed, an inputting position is specified through indication of the operating buttons or the display viewed through the mesh layer, and when the flip cover is open, an inputting position is specified in accordance with the pattern based on the colored layer and the low reflection layer.

2. The portable instrument terminal according to claim 1, wherein in the transparent thin plate, a shape of openings in the meshes of the mesh layer is polygonal.

3. The portable instrument terminal according to claim 1, wherein in the transparent thin plate, the colored layer is nickel plating, and the low reflection layer is a layer subjected to black plating or a chemical conversion treatment.

4. The portable instrument terminal according to claim 1, wherein in the transparent thin plate, the low reflection layer is laminated on the front surface of the colored layer laminated on the metal layer of the mesh layer of the bands, by a black plating treatment.

5. The portable instrument terminal according to claim 1, wherein in the transparent thin plate, the low reflection layer is laminated on the front surface of the colored layer laminated on the metal layer of the mesh layer of the bands, by a chemical blackening conversion treatment.

6. The portable instrument terminal according to claim 1, wherein the transparent thin plate, further comprises, between the metal layer of the mesh layer and the transparent substrate, a black colored layer arranged along the meshes of the metal layer of the mesh layer.

* * * * *